(12) United States Patent
Frasier et al.

(10) Patent No.: US 7,721,292 B2
(45) Date of Patent: May 18, 2010

(54) SYSTEM FOR ADJUSTING RESOURCE ALLOCATION TO A LOGICAL PARTITION BASED ON RATE OF PAGE SWAPS AND UTILIZATION BY CHANGING A BOOT CONFIGURATION FILE

(75) Inventors: Lawrence Martin Frasier, Charlotesvill, VA (US); Robert George Resino, Brighton, CO (US)

(73) Assignee: International Business Machines Corporation, Armonk, NY (US)

( * ) Notice: Subject to any disclaimer, the term of this patent is extended or adjusted under 35 U.S.C. 154(b) by 1552 days.

(21) Appl. No.: 11/014,308

(22) Filed: Dec. 16, 2004

(65) Prior Publication Data

US 2006/0136761 A1  Jun. 22, 2006

(51) Int. Cl.
*G06F 9/46* (2006.01)
*G06F 15/173* (2006.01)

(52) U.S. Cl. .................. 718/104; 718/105; 709/226

(58) Field of Classification Search .................. 718/104, 718/1–103, 105–108
See application file for complete search history.

(56) References Cited

U.S. PATENT DOCUMENTS

| | | | | | |
|---|---|---|---|---|---|
| 5,062,055 | A | * | 10/1991 | Chinnaswamy et al. | 702/182 |
| 5,319,760 | A | * | 6/1994 | Mason et al. | 711/208 |
| 5,390,334 | A | * | 2/1995 | Harrison | 713/324 |
| 5,444,642 | A | * | 8/1995 | Montgomery et al. | 702/91 |
| 5,517,643 | A | * | 5/1996 | Davy | 718/105 |
| 5,621,663 | A | * | 4/1997 | Skagerling | 702/186 |
| 5,761,680 | A | * | 6/1998 | Cohen et al. | 707/206 |
| 5,838,968 | A | * | 11/1998 | Culbert | 718/104 |
| 5,860,095 | A | * | 1/1999 | Iacobovici et al. | 711/119 |
| 5,982,814 | A | * | 11/1999 | Yeh et al. | 375/222 |
| 6,000,006 | A | * | 12/1999 | Bruce et al. | 711/103 |
| 6,134,602 | A | * | 10/2000 | Engstrom et al. | 719/328 |
| 6,158,007 | A | | 12/2000 | Moreh et al. | |
| 6,195,685 | B1 | | 2/2001 | Mukherjee | |
| 6,212,544 | B1 | * | 4/2001 | Borkenhagen et al. | 718/103 |
| 6,233,664 | B1 | * | 5/2001 | Hwang | 711/165 |
| 6,247,042 | B1 | * | 6/2001 | Engstrom et al. | 718/107 |
| 6,438,574 | B1 | * | 8/2002 | Nagashima | 718/102 |
| 6,647,408 | B1 | * | 11/2003 | Ricart et al. | 718/105 |

(Continued)

OTHER PUBLICATIONS

INSPEC: C2003-04-6150N-011 Integrating Heterogeneous Communication and Messaging Systems in An Object-Oriented Middleware Framework.

*Primary Examiner*—Thomas Lee
*Assistant Examiner*—Adam Lee
(74) *Attorney, Agent, or Firm*—Arthur J. Samodovitz

(57) ABSTRACT

Program instructions, responsive to processor utilization being above a first predetermined upper threshold, automatically change a boot configuration file of the server to increase a number of real processors, physically resident within the server, allocated to LPAR effective upon a next boot-up of the server. Program instructions, responsive to the processor utilization being below a second predetermined lower threshold, automatically change a boot configuration file to decrease a number of the real processors, physically resident within the server, allocated to the LPAR effective upon a next boot-up of the server. Program instructions, responsive to the processor utilization being below a second predetermined lower threshold, automatically change a boot configuration file to decrease a number of the real processors, physically resident within the server, allocated to the LPAR effective upon a next boot-up of the server.

2 Claims, 8 Drawing Sheets

U.S. PATENT DOCUMENTS

| | | | |
|---|---|---|---|
| 6,658,648 B1* | 12/2003 | Douceur et al. | 717/120 |
| 7,065,764 B1* | 6/2006 | Prael et al. | 718/102 |
| 7,143,222 B2* | 11/2006 | Fisher et al. | 710/200 |
| 7,299,469 B2* | 11/2007 | Hamilton et al. | 718/104 |
| 2001/0051890 A1 | 12/2001 | Burgess | |
| 2002/0010776 A1 | 1/2002 | Lerner | |
| 2002/0087611 A1* | 7/2002 | Tanaka et al. | 709/1 |
| 2002/0120717 A1 | 8/2002 | Giotta | |
| 2002/0194251 A1* | 12/2002 | Richter et al. | 709/105 |
| 2003/0028577 A1 | 2/2003 | Dorland et al. | |
| 2003/0055951 A1 | 3/2003 | Chemali | |
| 2003/0061312 A1* | 3/2003 | Bodner et al. | 709/220 |
| 2003/0065688 A1* | 4/2003 | Dageville et al. | 707/205 |
| 2003/0115317 A1 | 6/2003 | Hickson et al. | |
| 2003/0120502 A1 | 6/2003 | Robb et al. | |
| 2003/0177165 A1* | 9/2003 | Bradley et al. | 709/105 |
| 2006/0101224 A1* | 5/2006 | Shah et al. | 711/173 |

* cited by examiner

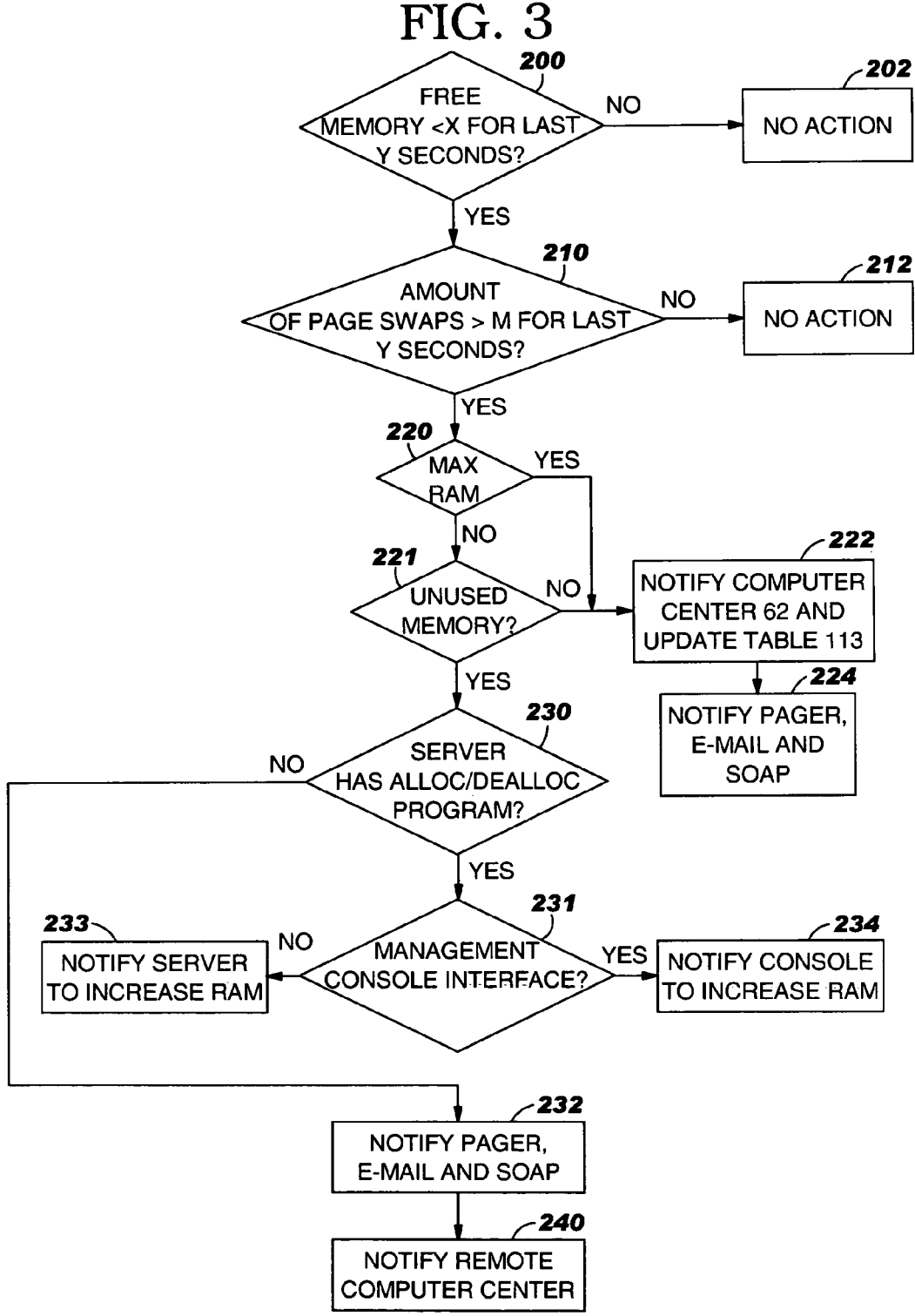

STEP 460

STEP 470

SYSTEM FOR ADJUSTING RESOURCE ALLOCATION TO A LOGICAL PARTITION BASED ON RATE OF PAGE SWAPS AND UTILIZATION BY CHANGING A BOOT CONFIGURATION FILE

FIELD OF THE INVENTION

The invention relates generally to computer systems, and deals more particularly with a technique to automatically allocate or de allocate computer resources as appropriate.

BACKGROUND OF THE INVENTION

Computer servers are well known today to execute applications for clients. A server includes various resources such as one or more processors, memory and storage used by the applications during execution. If the usage of one or more of the resources nears or reaches capacity, this may slow execution of the applications on the server. To alleviate this problem, one or more applications executing on this server can be transferred to another server, or in some servers, additional resources can be allocated to the server. Conversely, if one or more of the resources of this server are being used well below capacity, it may be cost effective to load another application on this server to better utilize the resources.

Some computers sold to customers include one or more processors and units of memory that are disabled, so they are not used by the customer or charged to the customer until the customer needs them and they are enabled and allocated. So, if the customer needs additional processing power or memory, then an unused processor or unit of memory can be allocated, and the customer is then charged for it. Conversely, if the customer does not currently need all of the processing power or memory currently enabled and allocated, then the excess processing power and memory can be de allocated and disabled, so the customer will not be charged for it. This is one type of e-business on demand computing.

Some servers are configured into logical partitions ("LPARs"), where some or all of the physical resources of a single computer are logically divided into separate "virtual" computers. In the case of CPUs, each LPAR is allocated a certain share of total processor time (i.e. "virtual" processors) or a certain number of real processors. In the case of memory and storage, each LPAR is allocated a certain amount. Specific, real memory and real storage units can be dedicated to the LPAR or "virtual" memory and "virtual" storage can be allocated. In the latter case, the location of the real memory and real storage for any LPAR can be located anywhere in the real computer. Applications execute in an LPAR similar to how they execute in a real computer. If the usage of one or more of the virtual resources allocated to an LPAR nears capacity, this may slow execution of the applications in the LPAR. In such a case, an unused resource can be allocated to this LPAR, some of an under utilized resource of another LPAR can be transferred to the resource constrained LPAR, or an application executing in this LPAR can be transferred to another LPAR. Conversely, if one or more of the virtual resources is being used well below capacity, it may be cost effective to load another application into this LPAR or transfer some of the resources of this LPAR to another LPAR where they are needed.

It is well known to monitor use of a server's real resources and an LPAR's real and virtual resources. For example, a known 'vmstat' program (written by Henry Ware at Youngstown State University, in Youngstown, Ohio) executing in a Unix computer monitored an amount of processor usage, (real) RAM availability, (virtual) memory also called "Swap Space" or "Paging Space", I/O in, I/O out, interrupts per second, context switches per second, processes waiting for run time, processes in uninterruptable sleep, page swapping from RAM to storage and processes swapped out but otherwise runable in the Unix computer. The 'vmstat' program reported the results to a local or remote systems administrator, database or program. For example, the 'vmstat' program reported the resource utilization or availability to an IBM Tivoli program running on the server, and the IBM Tivoli program reported the utilization to a remote database and Tivoli Enterprise Console. The 'vmstat' program can also report the resource utilization or availability to an IBM Performance Monitor ("PMON") program which displays the results locally to a systems administrator or stores the results in a database. If the processor usage within a server is above a predetermined upper threshold, and a systems administrator notices the problem, the systems administrator may attempt to determine the cause of the problem. For example, an application executing in the server may be "hogging" the processor (s). In such a case, the systems administrator may move this application to another server, or modify it to use less processing power. Alternately, the systems administrator or a technician can physically install an additional processor into the server. As noted above, in some servers, there are unused processors and memory (because the customer does not want to pay for them until needed). An IBM Capacity Upgrade On Demand ("CUOD") program was currently known to enable/allocate such an unused processor or memory into use upon request by the systems administrator. Likewise, if the server's usage of processor or memory is very low, a systems administrator can invoke the CUOD program to disable/de allocate some of the processor or memory, upon request by a systems administrator, and such de allocated processor or memory will become unused (and unpaid by the customer). While the current CUOD program executes on the server being managed, it is invoked via an IBM Hardware Management Console for the server. (This ensures centralized monitoring of the allocations and de allocations by the CUOD program. Such allocations and de allocations affect customer billing.)

A "Disk Free" or 'df' (by Glenn Fowler of AT&T Corp.) program function is also known to monitor an amount of allocated storage that is currently availability, i.e. not currently used by server or LPAR to which it is allocated. The Disk Free program monitors storage availability by examining the statistics of mounted file systems. The original DF program was included in Version 1 of AT&T Unix operating system.

An IBM Total Storage SAN File System program and an SAN Volume Controller program based on IBM StorageTank (tm) technology is currently known to manage storage as a pool. Many customers can share the same storage pool. Statistically, this provides the most efficient utilization of the storage pool, because at some times some of the customers will have low storage needs while other customers will have high storage needs. The IBM Total Storage SAN Volume Controller program monitors the amount of storage utilization and availability. The storage is based on storage policies. For example, a storage policy may require three copies of certain types of files, but only two copies of others. The number of copies affects the amount of storage utilization. Another storage policy may indicate how long backup copies are retained in storage before deletion. This also affects the amount of storage utilization.

Remote monitoring of servers was also known, as well as an XML protocol. For example, US Patent Publication 2001/0051890 A1 to Burgess discloses a monitored system which includes probes or agents for gathering data on the operating system, database and applications, and sends it to a productivity center. The productivity center receives the data, determines if any jobs need to be performed and allocates jobs to associates. The data exchanged between the productivity center and the monitored system is made using XML protocol. The productivity center also includes an escalation engine which sends alerts and notifications to appropriate personnel.

An object of the present invention is to automatically allocate and de allocate computer resources as appropriate to effectively execute the applications on a server without allocating excessive computer resources.

SUMMARY OF THE INVENTION

The invention resides in a system and computer program product for automatically adjusting allocation of processing power in a server. The server includes means for monitoring utilization of the processing power in the server and reporting the utilization of the processing power to the system, or means for monitoring availability of the processing power in the server and reporting the availability of the processing power to the system. The system comprises means or program instructions, responsive to a report that the processor utilization is above a first predetermined upper threshold or the processor availability is below a first predetermined lower threshold, for determining if the server can accommodate allocation of additional processing power, and if so, generating a request to allocate additional processing power to the server. The system also comprises other means or program instructions, responsive to a report that the processor utilization is below a second predetermined lower threshold or the processor availability is above a second predetermined upper threshold, for determining if the server can accommodate a de allocation of processing power, and if so, generating a request to de allocate some of the currently allocated processing power from the server.

According to a feature of the present invention, there are other means or program instructions for determining if the server includes a program to automatically allocate additional processing power to the server or de allocate some of the currently allocated processing power from the server. If so, the generated request is sent to the program. If not, the generated request is sent to a local management console or remote management system for the server.

The invention also resides in a system and computer program product for automatically adjusting allocation of memory in a server. The server including means for monitoring utilization of the memory in the server and reporting the utilization of the memory to the system, or means for monitoring availability of the memory in the server and reporting the availability of the memory to the system. There are means or program instructions, responsive to a report that the memory availability is below a first predetermined lower threshold or the memory utilization is above a first predetermined upper threshold, for determining if the server can accommodate allocation of additional memory. There are other means or program instructions, responsive to a determination that the server can accommodate allocation of additional memory, for generating a request to allocate additional memory to the server. There are other means or program instructions, responsive to a determination that the server cannot accommodate allocation of additional memory, for notifying an administrator or another system to identify another server to execute one or more applications currently executing on the server.

According to a feature of the invention, there are other means or program instructions, responsive to the report, for determining if page swapping from the memory is above another predetermined threshold. If so, the request generating means is notified to generate the request to allocate the additional memory to the server. If not, the request generating means is not notified to generate the request to allocate the additional memory to the server.

BRIEF DESCRIPTION OF THE FIGURES

FIG. 3 is a flow chart illustrating steps performed by the rules engine within the management computer of FIG. 1 to dynamically manage memory allocation to the managed server.

DETAILED DESCRIPTION OF THE PREFERRED EMBODIMENTS

Figure 1:
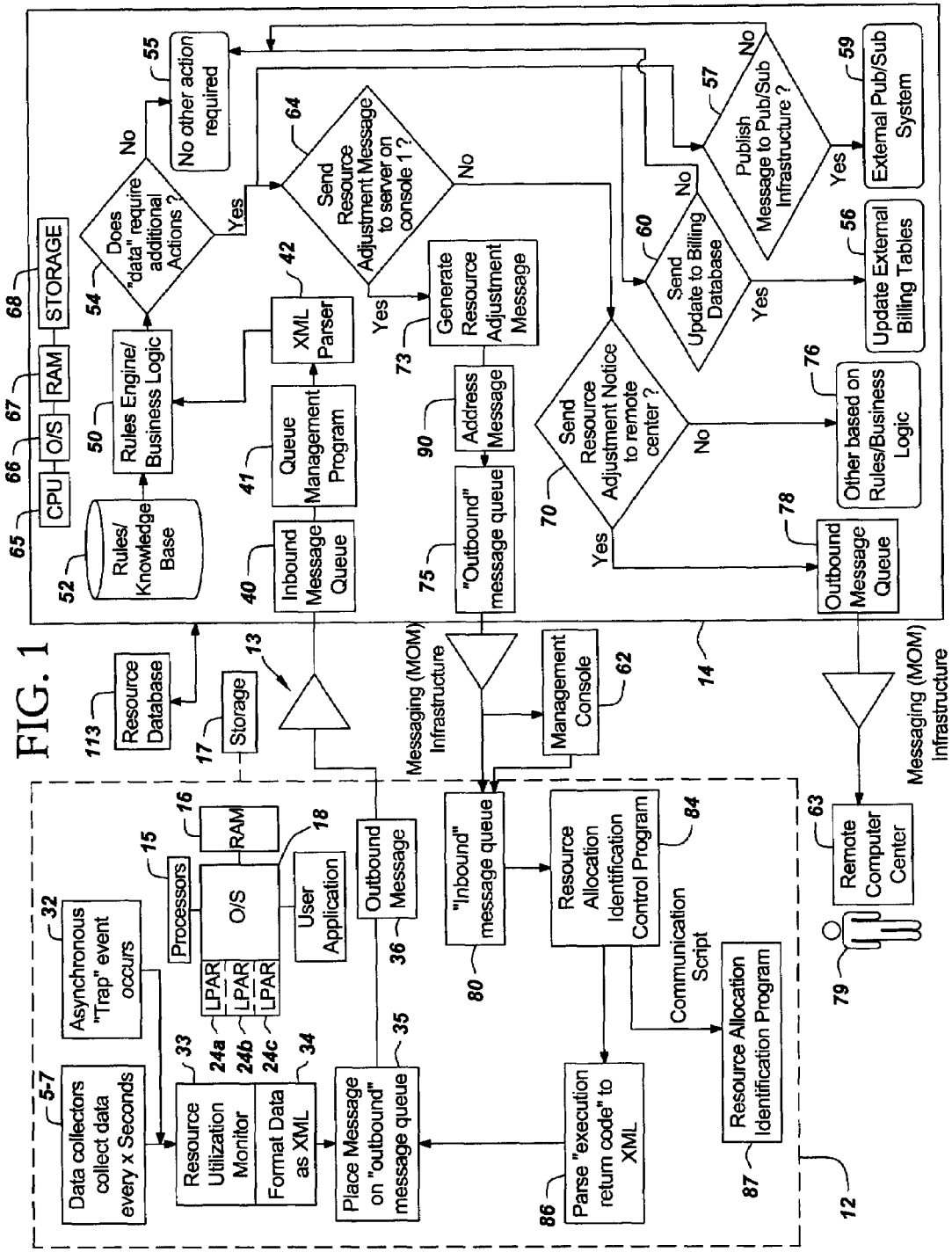
FIG. 1 is a block and flow diagram illustrating a server whose resources are being managed and a management computer according to the present invention.

The present invention will now be described in detail with reference to the figures. FIG. 1 illustrates a distributed computer system generally designated 10 according to one embodiment of the present invention. System 10 comprises a resource-managed server 12 connected by a network 13 to a resource management computer 14. Server 12 includes "resources" in the form of one or more processors 15, RAM 16, and storage 17, which can be local or remote to server 12. Server 12 also includes an operating system 18 and various user applications 21 to provide service to clients (although the nature of the service is not important to the present invention). Examples of the operating system 13 are UNIX (™ licensed by X/OPEN Company, Limited), Linux™ of Linus Torvalds), IBM z/OS, IBM z/VM or Microsoft Windows NT operating systems. Some of the operating systems such as IBM z/OS and z/VM operating system can partition server 12 into Logical Partitions ("LPARs") 24 a,b,c, others such as Unix, Linux and Windows operating system do not. Server 12 is a type that may include physical resources such as one or more of processors 15, RAM 16 and storage 17 that are not currently allocated for use in server or LPARs 24 a,b,c. This may be part of an "on-demand" business model, where the customer/user of server 12 only pays for the resources that are allocated. In such a case, to save money, the customer may not want excess resources to be allocated. (Alternately, there may be other processors and RAM that physically reside outside of the server 12 enclosure, but can be operatively coupled to server 12 via a high speed network when needed.) As described in more detail below, resource management computer 14 dynamically and automatically determines appropriate allocation of resources to and de allocation of resources from the user of server 12 and LPARs 24 *a,b,c* (in the case of logical partitioning) to enable applications 21 to effectively execute in server 12, without allocating excessive resources to server 12 and LPARs 24 *a,b,c*. Computer 14 includes a CPU 65, operating system 66, random access memory 67 and disk storage 68. Computer 14 communicates the appropriate resource allocation and de allocation information to server 12, directly or indirectly, (as a message) for server 12 to implement when feasible. Server 12 includes a resource allocation/de allocation control program 84 to translate the resource allocation or de allocation message into a command script. Server 12 also includes a resource allocation/de allocation program 87 which responds to the command script to actually allocate or de allocation the resources. In one embodiment of the present invention, computer 14 can send the resource allocation or de allocation message ("resource adjustment message") directly to server 12. In another embodiment of the present invention, computer 14 directs its resource adjustment message to a management console 62 for server 61. After authenticating computer 14, management console 62 forwards the resource adjustment message to program 84. In some cases, as described below, program 87 cannot automatically adjust the resource allocation in server 12 or the subject LPAR. In such cases, messages are sent to a remote computer center 63 or systems administrators to determine other remedies, such as transferring one or more applications from one server or LPAR to another.

Server 12 also includes known data collectors 5, 6 and 7 such as hardware and software to measure an amount of usage or availability of processors 15, random access memory ("RAM") 16 and disk storage 17, respectively. For example, data collector 5 can comprise a PERL or Sun JAVA program running on the hardware which measures processor utilization by execution of a vmstat or similar program. Data collector 6 can comprise a PERL or Sun JAVA program running on the hardware which measures RAM utilization by execution of a vmstat or similar program. Data collector 7 can comprise a PERL or JAVA program running on the hardware which measures storage utilization by using the "DF" program or similar program. Each of the data collectors reports its data periodically, such as every thirty seconds, to a resource utilization or availability, monitor program 33. As described in more detail below, the monitor program 33 reports the data periodically to management computer 14. By way of example, program 33 may comprise a known 'vmstat' program function to monitor processor utilization or memory availability, and a known Disk Free program function to monitor storage availability. Server 12 also includes hardware and/or software 32 which generates asynchronous traps when certain events occur, such as when utilization of a computer resource exceeds an upper threshold level or falls below a lower threshold level. (The former case may indicate the need to allocate additional resources. The latter case may indicate a need to de allocate excess resources.) The 'vmstat' program function and Disk Free program function may periodically read the traps generated by hardware and/or software 32 and periodically report them to management computer 14 as described below. Alternately, the 'vmstat' program and Disk Free program may read the traps as they are generated, and send the asynchronous resource utilization data to computer 14 when generated.

Figure 2:
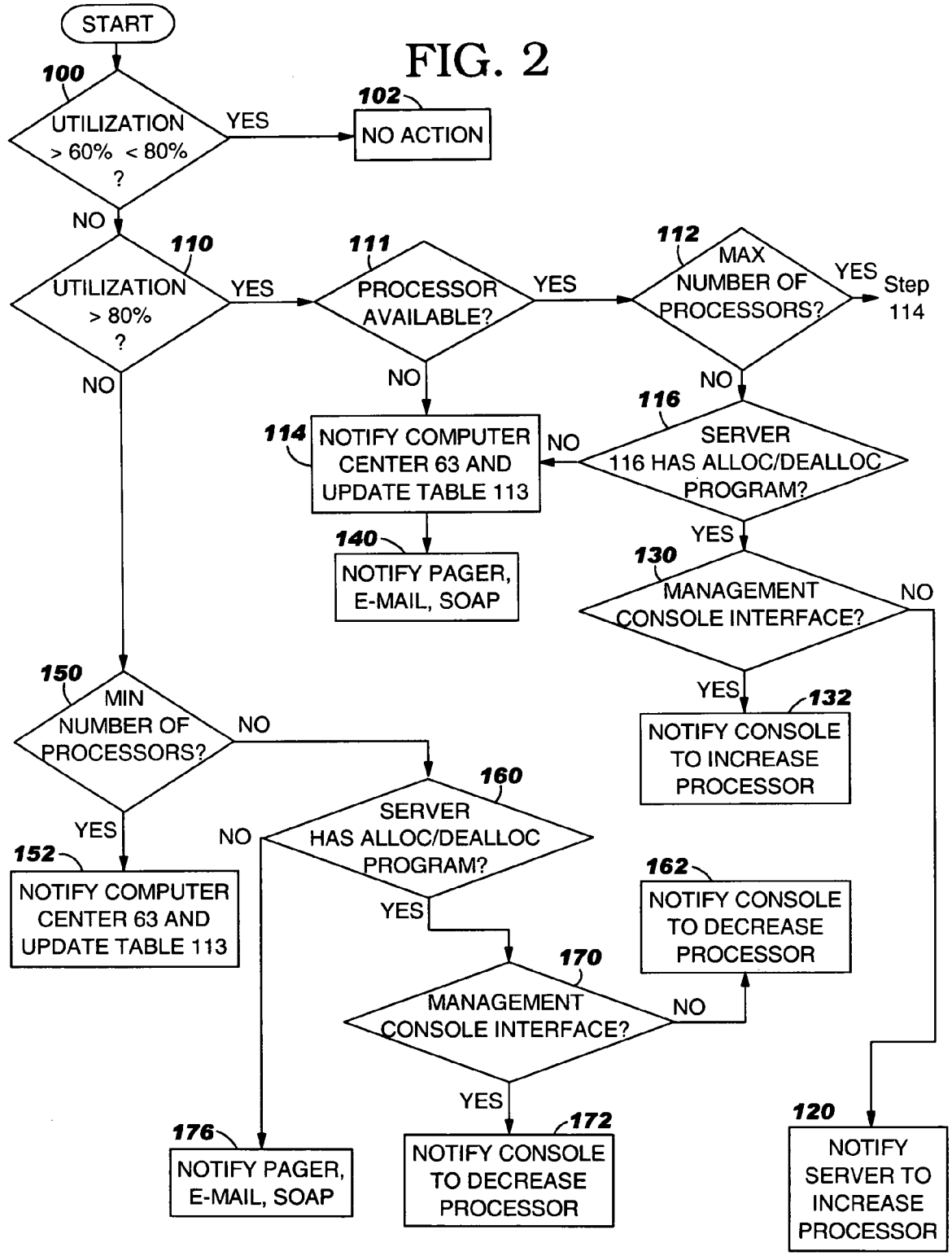
FIG. 2 is a flow chart illustrating steps performed by a rules engine within the management computer of FIG. 1 to dynamically manage processor allocation to the managed server.

The resource utilization or availability monitor program 33 passes the resource utilization (or availability) data to a formatting program 34 within server 12 which formats the data into a network transmission format such as XML format. XML format is well known and is further described in various standards documents released by the World Wide Web Consortium such as Extensible Markup Language (XML) 1.0. Next, a queue management program 35 such as an IBM WebSphere MQ "putter" program within server 12 places the XML message onto an outbound message queue 36 to be sent over network 13 to resource management computer 14. In the illustrated example, the "network 13" includes a message routing server such as the IBM Websphere MQ Manager (message oriented middle ware) server, although other embodiments of network 13 can include other types of routers and servers. When the message reaches computer 14, it is placed on an inbound message queue 40 where a queue management program 41 such as an IBM WebSphere MQ "getter" program takes the message off the inbound message queue and passes it to a parser program 42, such as an XML parser program. Next, the parser program 42 parses the message received from server 12 to extract the resource utilization or availability data (originating from collectors 5-7 or hardware and/or software 32 at server 12). Parser program 42 furnishes the resource utilization or availability data to rules engine/business logic 50. The rules engine 50 determines, based on its rules/knowledge base 52 and the current resource utilization or availability data, what if any action should be taken and what system should take the action (decision 54). If the current utilization of all resources is within an optimum range (for example, between respective upper and lower thresholds in the case of processor utilization, below an upper threshold in the case of memory utilization or between respective upper and lower thresholds in the case of storage utilization), then no action is taken (step 55). (Alternately, the optimum range for memory utilization is between respective upper and lower thresholds.) However, if the current utilization of one or more resources is outside the optimum range, then the rules engine 50 will determine an amount of and initiate an adjustment of the allocation of the one or more resources to the sever 12 or subject LPAR or recommend that an application be transferred to or from the server 12 or the subject LPAR (decision 54, yes branch). (FIG. 2 illustrates the rules/knowledge base of rules engine 50 in more detail as described below.) Rules engine 50 includes program instructions stored on computer readable storage media 68 for execution by CPU 65 via computer readable memory 67. The adjustment can result in allocation of unused resources to the server or subject LPAR or de allocation of currently allocated resources (to the disabled/unused state).

If the resource allocation can be performed automatically by program 87 within server 12 (decision 64, yes branch), program 73 addresses the resource adjustment message to the proper destination to activate program 87, i.e. server 12 or management console 62 (step 90). (In the case of the management console 62 receiving the resource adjustment message, the management console, after recording the proposed resource adjustment and ensuring that it originated from an authorized source, forwards the resource adjustment message to server 12.) In some cases it is not possible or practical for program 87 to adjust the resource allocation in server 12, for example, if the server 12 or subject LPAR cannot physically accommodate an additional allocation or a de allocation, or if there are no additional resources to allocate (decision 64, no branch). In such a case, the rules engine will send the resource adjustment message or a description of the resource constraint or excess to a remote computer center 63 (decision 70, yes branch). This will notify an administrator 79 to consider transferring an application to or from server 12 or the subject LPAR to balance resource utilization. This is a remedy when the program 87 in server 12 cannot make the required allocation or de allocation.

In addition, if the resource adjustment action automatically implemented by resource allocation/de allocation program 87 will affect billing, such as a change in allocation of a resource which is billed to a customer based on usage, then the rules engine 50 will notify a billing function 56 (decision 54, yes branch, decision 60, yes branch). In such a case, the billing function 56 will update a billing database, and the customer's bill will be adjusted accordingly. In some cases, the proposed resource adjustment, or utilization or availability data needs to be broadcast to "subscribers" such as administrators or applications other than the computer center 63 to resolve the problem (decision 54, yes branch, decision 57, yes branch). Such administrators can manually intervene to adjust the resource allocation, or transfer an application from one server or LPAR to another server or LPAR to adjust resource utilization. This broadcast can be made to a known Simple Object Access Protocol ("SOAP") interface 59 or other such publication system. The SOAP interface publishes the message to a "channel". Subscribers 59 who have registered for this channel will then see the message. When registering for a channel, the subscribers indicate the manner of receiving the message, for example, a pop up window on their computer screen, automatic entry into a configuration database, an interrupt to an application or call to an application. For example, if the processor(s) or memory is near capacity and another processor or memory can be added manually (but not automatically by program 87), the message to the SOAP interface will result in notification to a systems administrator to manually add the processor or memory, and automatically update a configuration database 113 to indicate the proposed addition of the processor or memory. Likewise, if the processor(s) or memory is underutilized, and a currently allocated processor or some of the currently allocated memory can be removed manually (but not automatically by program 87), the message to the SOAP interface will result in notification to a systems administrator to manually de allocate the processor or memory, and automatically update configuration database 113 to indicate the proposed de allocation of the processor or some of the memory.

The following is a more detailed description of handling of the resource adjustment message after generation by rules engine 50 and receipt at server 12. The resource adjustment message can request to allocate another processor or processor time slice, de allocate a currently allocated processor or processor time slice, allocate a specified amount of additional memory, de allocate a specified amount of currently allocated memory, or allocate a specified amount of additional storage or de allocate a specified amount of currently allocated storage. The resource adjustment message can also request to change a storage policy to increase or decrease a number of copies of certain types of files, change a specification of which files get backed up or change a storage duration to better utilize available memory or free-up memory when in short supply. However, a request to change a storage policy will be made to a remote storage manager (not server 12) in the case of remote storage. Rules engine 50 also determines where to send the resource adjustment message, i.e. server 12, management console 62, remote computer center 63, SOAP interface 59, etc., as noted above.

By way of example, program 87 can be the IBM Capacity Upgrade On Demand ("CUOD") program, modified to execute on server 12 and be activated directly from computer 14. (The preexisting CUOD program requires activation via the IBM Hardware Management Console.) In the case of the modified CUOD program, the rules engine 50 passes the resource adjustment message to a translation program 73 within server 14. The translation program 73 converts the resource adjustment message from the rules engine 50 into a form corresponding to that of a command script (program) to be generated "downstream" by resource allocation/de allocation control program 84 within server 12. The command script will command resource allocation/de allocation program 84 within server 12 to adjust the resource allocation/de allocation for server 12 or the subject LPAR.

In one embodiment of the present invention, translation program 73 converts the resource adjustment message from rules engine 50 into an XML message to be sent to server 12. By way of example, program 73 generates the following XML resource adjustment message:

<?xml version="1.0"?>
<!ELEMENT command (#PCDATA)>
<!ELEMENT argument1 (#PCDATA)>
<!ELEMENT argument2 (#PCDATA)>
<!ELEMENT argument3 (#PCDATA)>
<!ELEMENT argument4 (#PCDATA)>

The first line of the XML message is a document type definition and identifies the message as XML format, and also the version number of the XML form. The second line of the message, "ELEMENT command", identifies the application that will perform the command and the high level nature of the command, such as to make a change using the CUOD program 87 ("CDCUOD" for short). This command will be the first command in the script generated downstream by program 84. (The term #PCDATA notifies the Xml parser in server 12 that the entity contains parsible character data.) The third line of the XML message, "argument1", identifies the location of the CUOD program 87 and will be the second command in the script generated downstream by program 84. For example, if the resource allocation/de allocation program 87 is running on server 12, then argument1 will be the identity (IP address or host name) of server 12. If the resource allocation/de allocation program 87 is running on the management console 62, then argument1 will be the identity of management console 62. The fourth line in the XML message, "argument2" indicates more detail about the command, such as to allocate/enable or de allocate/disable (an unspecified resource). Argument2 will be the third command in the script generated downstream by program 84. The fifth line in the XML message, "argument3" specifies an authorization key to activate the additional storage or de allocate currently allocated storage. Argument3 will be the fourth command in the script generated downstream by program 84. The sixth line in the XML message, "argument4" specifies the number of processors or amount of memory (to allocate or de allocate). Argument4 will be the fifth command in the script generated downstream by program 84. Program 73 sends the XML resource adjustment message via outbound message queue 75, network 13 and inbound message queue 80 to program 84 to generate the command script. The program 84 parses the XML message to separate each line, and generates a corresponding line of command script. For the foregoing XML resource adjustment message, the corresponding command script is as follows:

!/usr/bin/perl
exec "$command", "$argument 1",
"$argument 2",
"$argument 3",
"$argument 4".

Then, program 84 sends the command script, line by line, to the program 87 for execution.

In another embodiment of the present invention, translation program 73 in computer 14 communicates with server 12 using a Secure Shell ("SSH") protocol. (While not required for the present invention, the SSH protocol includes the following steps before sending the resource adjustment message. Computer 14 initiates an SSH connection (such as SSH version 2) to server 12 so the two computers can authenticate themselves to each other. Computer 14 will initially try to authenticate itself using a host based method such as an RSA public key method or DSA algorithm. The computer 14 uses its public key to encrypt the private key, and the server 12 uses the private key ($HOME/.ssh/id_rsa or $HOME/.ssh/id_dsa) to encrypt a signature and session, and sign a session identifier and sends the result to computer 14. Computer 14 checks whether the matching public key is listed in $HOME/.ssh/authorized_keys and grants access if both the private key furnished by the server 12 and the signature are correct. Computer 14 derives the session identifier from a shared Diffie-Hellman value; the session identifier is only known to server 12 and computer 14.) After authentication is successfully completed between computer 14 and server 12, computer 14 initiates an SSH (such as SSH2) connection to server 12 (or the management console 62) and sends the resource adjustment message. By way of example, program 73 generates the following SSH resource adjustment message:

"ssh username@server command argument1, argument2, argument3, argument4."

The first field of the SSH message is a document type definition and identifies the message as SSH. The second field of the SSH message indicates server 12 or management console 62 as the target of the command script and the name of a (root) privileged user on server 12 who has authority to make the commands of the command script generated downstream by program 84. The third field of the message is the "command" which indicates the program that will perform the command and the high level nature of the command, such as to make a change using the CUOD program 87. This command will be the first command in the script generated downstream by program 84. The argument1 field of the SSH message will be the second command in the script generated downstream by program 84. For example, if the resource allocation/de allocation program is running on the server 12, then argument1 will be the identity of server 12. If the resource allocation/de allocation program is running on the management console 62, then argument1 will be the identity of management console 62. The argument2 field indicates an option for the command, such as to allocate/enable or de allocate/disable. Argument2 field will be the third command in the script. The argument3 field specifies an authorization key to activate the additional storage or de allocate currently allocated storage. Argument3 will be the fourth command in the script. The argument4 field specifies the number of processors or amount of memory (to allocate or de allocate). Argument4 will be the fifth command in the script. The SSH message is sent via outbound message queue 74, network 13 and inbound message queue 80 to program 84 to generate the command script. The program 84 parses the SSH message to separate each field, and generates a corresponding line of command script. For the SSH message, the corresponding command script is the same as listed above for the XML message. After processing the resource adjustment message, program 84 will generate a return code for computer 14, management console 62, if present, and remote computer center 63 for logging (step 320).

Thus, program 73 addresses the translated resource adjustment message (whether formatted as XML or SSL) to server 12 or management console 62 (step 90). A queue management program, such as IBM WebSphere MQ "putter" program, then places the XML or SSH message on an outbound message queue 75 to be sent to server 12 or console 62. The message then proceeds via network 13 (including a message routing server and/or other routers) to an inbound message queue 80 if sent to server 12 or another, inbound message queue (not shown) within console 62. Program 84 in the form of a known Practical Extraction and Reporting Language ("PERL") scripting program, Kornshell scripting program, REXX scripting program or the like receives the XML or SSH message from the inbound queue 80 or from console 62, after authentication. Program 84 converts the resource adjustment XML or SSH message into a command script suitable to operate on the program 87 (such as the IBM CUOD program) in server 12 to allocate or de allocate the resource as determined by the rules engine 50 (step 70).) The script directs program 87 to implement the desired adjustment to the resources of server 12. The operation of the CUOD program to adjust processor allocation in server 12 in response to the script is further illustrated in FIG. 5, and described below. The operation of the CUOD program to adjust memory allocation in server 12 in response to the script is further illustrated in FIG. 6, and described below. Afterwards, the program 84 creates an XML or SSH return code message (as the case may be) indicating that the script was executed, and places the return code message on the outbound queue 36 to be sent to computer 14 (steps 86 and 35). (Alternately, program 73 can generate an executable script and send it as a file to console 62. At console 62, program 84 requests that the operating system in server 12 run an executable program to reallocate the requested resources.)

In another embodiment of the present invention, there is a management console 62 for server 12 (and perhaps other local servers as well) which has responsibility for activating the CUOD program 84 or other allocating/deallocating program within server 12, and supplying the resource adjustment message to program 84. In this embodiment, rules engine 50 designates management console 62 (instead of server 12) to receive the resource adjustment message. Consequently, program 73 addresses the translated resource adjustment message (whether formatted as XML or SSL) to management console 62 (step 90). Then, when the translated resource adjustment message is placed on the outbound message queue 75, it is sent to the management console 62. The management console 62, after recording the request to adjust the resource allocation in server 12, forwards the translated resource adjustment message to inbound message queue 80 of server 12. Then, program 84 generates the script program to adjust the resource allocation within server 12, as described above.

When rules engine 50 determines that program 84 cannot make a satisfactory resource allocation or de allocation to bring the resource utilization within the optimum range, rules engine 50 will specify that the resource adjustment message or description of the resource problem be sent to a remote computer center 63 (decision 64, no branch and decision 70, yes branch). In such a case, the program 60 formats the resource adjustment message or notification as XML and places it on an outbound message queue 78 destined for the center 63 via network 13. The remote computer center 63 may automatically or with human intervention attempt to locate another server to execute one or more applications currently executing in server 12 in the case where the resources within server 12 are overloaded. In the case where the computer resources in server 12 are substantially under utilized, center 63 may attempt to locate one or more applications from other, overloaded servers to relocate to server 12 to best utilize the available resources in server 12.

Rules engine 50 knows where to send the resource adjustment message or problem notification based on the resource configuration table 113. Table 113 indicates whether program 84 can be activated directly or conversely, must be activated via management console 62. Table 113 also includes information indicating whether it is possible for program 87 to automatically adjust the resource allocation in server 12 to alleviate a resource constraint or de allocate excess resources. For example, table 113 indicates the amount of resources currently allocated to server 12 or the subject LPAR, a maximum level of resources that can be allocated by server 12 or the subject LPAR (based on physical limitations) and a minimum level of resources required by server 12 or the subject LPAR to execute. If the server 12 or subject LPAR currently has the maximum number of processors allocated to it, and still needs more processing power, then the rules engine 50 will send the resource adjustment message to center 63 or to the SOAP interface for manual intervention (for example, to transfer an application to another server or LPAR). Conversely, if the server 12 or subject LPAR currently has the minimum number of processors allocated to it, and they are substantially under utilized, then the rules engine 50 will send the resource adjustment message to center 63 or to the SOAP interface for manual intervention (such as to transfer another application to server 12 or the subject LPAR). A systems administrator supplied the information to database 113 indicating the maximum and minimum resource limits for server 12 and its LPARs, the initial allocation of resources to server 12 and its LPARs, the total amount of each type of resource in server 12 (whether or not enabled), whether server 12 includes resource allocation/de allocation program 87 and if so, whether computer 14 can activate it directly or must proceed through console 62. Subsequently, each time program 87 adjusts a resource allocation in server 12 or the subject LPAR, program 87 notifies the resource configuration management database 113. Database 113 may be contained within server 12 or maintained remotely to server 12.

Referring again to decision 70, no branch, there may be some cases where the rules engine 50 determines a course of action which is not a resource adjustment message or notification to server 12, management console 62, center 63 or the SOAP interface. For example, rules engine 50 may decide to send a request to a resource control program (not shown) such as IBM Tivoli Intelligent Orchestration program to add another server to share the workload of server 12 (step 76).

The foregoing describes the processing by resource management computer 14 in response to one set of resource utilization or availability data supplied by server 12 after one interval. In one embodiment of the present invention, the rules engine 50 attempts to correct the resource constraint or excess in one iteration, i.e. by requesting, in a single resource adjustment message, allocation or de allocation of sufficient resources to bring the server 12 or subject LPAR within the optimum range of resource utilization. This is desirable where the computer and business environment want a rapid change of resource allocation to track rapid changes in resource requirements, i.e. to accommodate sharp peaks and valleys in demand.

However, in another embodiment of the present invention, the rules engine 50 attempts to correct the resource constraint or excess more gradually in an iterative manner. This is desirable when certain types of programs may be running on a hardware platform. A multithreaded JAVA application might perform 4 to 5 times better with the addition of a single processor. In many cases it is more economical and prudent to add processors one at a time and evaluate the effect. During the first iteration, the rules engine 50 requests (in one resource adjustment message) allocation or de allocation of a standard unit of resources, such as one processor or a predetermined amount of memory, even though the rules engine 50 knows that based on the current conditions this standard unit of resource allocation or de allocation will not bring the resource utilization into the optimum range. Then, when the next set of resource utilization or availability data is generated after the next periodic interval by data collectors 25-27 or if new asynchronous data is generated by hardware and/or software 32, the foregoing functions of FIG. 2 are repeated based on this new utilization or availability data. Thus, the rules engine 50 will again determine if another resource adjustment is appropriate, and if so, request another standard unit of resource adjustment. For example, if the first adjustment is to add one processor (real or virtual) to server 12, and this is insufficient as indicated by the next set of utilization or availability data, then the second adjustment can be to add another processor (real or virtual) to server 12. If the first adjustment is to add a predetermined-size block of memory to server 12, and this is insufficient, then the second adjustment pursuant to the next set of utilization or availability data can be add to another block of memory of the same size to server 12. If has too much processor capacity (i.e. too low a utilization) as indicated by the next set of the first adjustment is to de allocate one processor (real or virtual) from server 12, and server 12 still utilization or availability data, then the second adjustment can be to de allocate another processor (real or virtual) from server 12. If the first adjustment is to de allocate the predetermined-size block of memory from server 12, and server 12 still has too much memory capacity (i.e. too much availability), as indicated by the next set of utilization or availability data, then the second adjustment can be to de allocate another block of memory of the same size from server 12.

FIG. 2 illustrates in detail the function of rules engine 50 to determine when a resource adjustment can be made by program 87, and in one embodiment of the present invention, how much to adjust the resource allocation when variable amounts are permitted. FIG. 2 also illustrates how rules engine 50 determines where to send the resource adjustment message or notification. As explained above, the XML parser 42 supplies the parsed resource utilization or availability data (for processor, RAM, storage, etc.) to the rules engine 50. In response, rules engine 50 determines if the processor utilization is between upper and lower thresholds, for example between 60% and 80% utilization (decision 100). (If the processor utilization data is provided in terms of actual processor utilization, then the rules engine 50 converts the actual processor utilization to a percent of total utilization by dividing the actual processor utilization by the total processor allocation to server 12, as indicated by table 113.) In this example, the 60% and 80% range is the optimum utilization range, so the rules engine will take no action under these conditions (decision 100, yes branch). However, if the processor utilization is above 80% (decision 100, no branch and decision 110, yes branch), then the rules engine 50 determines, based on database 113, if server 12 has an unused processor or processor time slice (decision 111). If so, rules engine 50 determines, based on information within database 113, if server 12 or the subject LPAR already has its maximum processor allocation (step 112). (Due to a physical architecture of server 12 such as a number of slots for processor cards, limitations on heat dissipation, limitations on wiring, etc., server 12 can only have and utilize a limited amount of processors. An LPAR can only be allocated the maximum number of processors which can be allocated to the server of which the LPAR is a part.) If server 12 or the subject LPAR is already at the maximum processor allocation, then rules engine 50 updates database 113 to indicate that server 12 or the subject LPAR is processor constrained (step 114). Also, rules engine 50 generates a message that server 12 or the subject LPAR lacks sufficient processing capacity, and addresses this message to remote computer resource center 63 (step 114). After receipt of this message, center 63 will attempt to locate another server, local or remote to server 12, to host one or more applications currently running on server 12 or the subject LPAR. When the one or more applications are removed from server 12 or the subject LPAR, and installed on another server identified by center 63, then server 12 or the subject LPAR will have lesser processor needs. If this is the only application running on server 12, then server 12 can be decommissioned or loaded with another application which is less processor intensive.

Refer again to decision 111, no branch, where there is no unused processor or processor time slice to satisfy the need of server 12 or the subject LPAR. In such a case, rules engine 50 proceeds to step 114, as described above.

Refer again to decision 112, no branch where the server 12 or subject LPAR needs additional processor(s) and is physically able to utilize an additional processor or processor time slice. In this case, rules engine 50 determines, from database 113, if server 12 is currently running resource allocation/de allocation program 87 (step 116). If server 12 includes such software (decision 116, yes branch), then rules engine 50 determines, from database 113, if computer 14 can send a resource adjustment message directly to server 12 or whether computer 14 must send the resource adjustment message to a management console interface for server 12 (decision 130). If computer 14 can send the resource adjustment message directly to server 12 (decision 130, no branch), rules engine 50 generates a message for server 12 to allocate/enable an unused processor from server 12 or the subject LPAR, and addresses the message to server 12 (step 120). In the case of an LPAR with insufficient processor capacity, the additional allocation can be to an entire, real processor, an entire, virtual processor, or a partial virtual processor based on an additional time slice of the virtual processor. In response to this request, the program 84 will change a boot configuration file within server 12 to increase the number of processors or processor time slice at the next boot-up. Before the next boot-up, the program 84 will notify the operating system to assign tasks to the newly allocated processor.

Referring again to decision 116, yes branch and decision 130, yes branch, where server 12 is running resource allocation/de allocation program, but it must be activated through console 62. In such a case, then rules engine 50 generates a message to the management console 62 to increase the number of processors allocated/enabled for server 12 or the subject LPAR (step 132). In the case of a processor constraint for server 12, the resource adjustment message is to add an unused, real processor(s) within server 12. In the case of an LPAR with insufficient processor capacity, the additional allocation can be to an entire, real processor, an entire, virtual processor, or a partial virtual processor based on an additional time slice of the virtual processor.

However, if there is no automatic resource allocation/de allocation program 84 (decision 116, no branch), then the rules engine will do the following. Rules engine 50 will proceed to step 114 to update the table 113 to indicate the processor constraint and notify the remote computer resource center 63 so a systems administrator will attempt to locate another server to host one or more of the applications currently executing in server 12 or the subject LPAR. Also, the rules engine will send the resource adjustment message or notice to the SOAP interface to alert a systems administrator and other applications of the processor overload of server 12 or the subject LPAR (step 140). Also, in step 140, rules engine 50 can generate a message to send by pager or e-mail to a systems administrator. (Alternately, in the case of a processor overload of a single LPAR within server 12, rules engine 50 can determine from data base 113 if another of the LPARs within server 12 is operating at the lower end of its optimum utilization range. In such a case, rules engine 50 can make a request to decrease the processor allocation (by a fraction of a real processor) of this other LPAR and increase the processor allocation (by the fraction of the real processor) to the subject LPAR that has a processor overload.)

Refer again to decision 110, no branch, where the processor utilization is less than 60%, i.e. below the optimum utilization range, in the illustrated example. In this case, the rules engine 50 determines if the server 12 or subject LPAR is already at its minimum allocation (decision 150). (Due to the processor requirements of the operating system and a minimally processor-intensive application, there is a minimum processor allocation required for a server and each of its LPARs.) Rules engine 50 makes this determination by querying the database 113. If server 12 or the subject LPAR is already at its minimum allocation (decision 150, yes branch), then rules engine 50 notifies the remote computer center 63 that server 12 has excess processor capacity (step 152). (When center 63 learns that server 12 or subject LPAR has excess resources of all types, and another server becomes resource constrained, then center 63 can decide to transfer an application from the constrained server to the underutilized server 12 or subject LPAR.) Also, in step 152, the rules engine updates the table 113 to indicate that server 12 or the subject LPAR has excess processor capacity.

Refer again to decision 150, no branch, where the server 12 or subject LPAR is not currently at its minimum allocation. In such a case, rules engine 50 determines, based on database 113, if server 12 is currently running resource allocation/de allocation software 87 (decision 160). If server 12 is currently running such software 84, then rules engine 50 determines if computer 14 can activate it without involving a management console (decision 170). If so (decision 170, no branch), rules engine generates a message addressed to server 12 to de allocate a processor currently allocated to server 12 or the subject LPAR (step 162). In the case of an LPAR with excess processor capacity, the de allocation can be to an entire, real processor, an entire, virtual processor, or a partial virtual processor based on a time slice of the virtual processor.

Refer again to decision 170, yes branch, where server 12 is currently running resource allocation/de allocation program 87 but activation is via console 62, then rules engine 50 generates a message to the management console 62 to de allocate a processor currently allocated to server 12 or the subject LPAR (step 172). In response, management console 62 will authenticate the originator of the message, and then forward it to server 12 for handling by software 84 and 87. In the case of an LPAR with excess processor capacity, the de allocation can be to an entire, real processor, an entire, virtual processor, or a partial virtual processor based on a time slice of the virtual processor.

Refer again to decision 160, no branch where there is no resource allocation/de allocation program 84 within server 12. In such a case, rules engine 50 generates a message to send to the SOAP interface to alert a systems administrator or other application to intervene to alleviate the processor under utilization of server 12 or the subject LPAR (step 176). Alternately, rules engine 50 generates a message to a systems administrator via pager or e-mail (step 176). The intervention can be to load another application on server 12 or subject LPAR to increase the processor utilization there. In addition, rules engine 50 notifies the computer center 63 and updates the table 113 to indicate the processor under utilization.

FIG. 3 illustrates in detail steps taken by the rules engine 50 to determine whether an adjustment should be made to the memory allocation to server 12 or an LPAR within server 12, and if variable amounts are permitted, an amount of the adjustment. Server 12 can have unallocated/unused memory (because the customer does not want to pay for it until needed.) As explained above, the parsing program 42 supplies the resource utilization data to rules engine 50. In the illustrated example, the memory utilization data indicates an amount of free/available memory during the last interval (for example, thirty seconds) and the number of swapped pages during the last interval (for example, thirty seconds). Page "swapping" occurs when free memory is low, so contents of memory are written out or "swapped out" to storage to free up memory for other use. (The page swapping can be based on a least recently used or other known algorithm.) If the amount of free memory during the last interval is greater than a predetermined threshold (decision 200, no branch), then this is considered normal, i.e. there is no shortage of memory, and no action is taken (step 202). (The predetermined threshold depends on the memory requirements of the applications currently being executed.) However, if the amount of free memory during the last interval is less than the predetermined threshold (decision 200, yes branch), then rules engine 50 determines if the number of swapped pages during the last interval was greater than a predetermined threshold (decision 210). If not, then the memory is near capacity, but the hardware and/or software is managing the problem with a low/normal amount of page swapping. In this case, the page swapping can likely identify good candidates to swap out to storage, i.e. pages that will not be needed in memory for some time. So, no action is needed or taken regarding memory allocation (step 212).

Refer again to decision 210, yes branch where free memory is low and excessive page swapping is occurring to avoid memory overload. This is considered abnormal and burdensome to the processor and I/O within server 12. In such a case, rules engine 50 determines if server 12 or the subject LPAR currently has its maximum memory allocation (decision 220). This determination is based on a query to the database 113. If server 12 or the subject LPAR is currently at its maximum memory allocation, then rules engine 50 generates a message to remote computer center 63 and to the SOAP interface to attempt to locate another server or LPAR (with available resources) to host an application currently executing on server 12 or the subject LPAR (steps 222 and 224). When such a server or LPAR is located, then center 63 will notify an administrator to perform the rehosting process. Likewise, the notification to the SOAP interface will alert a systems administrator or other application to intervene.

Refer again to decision 220, no branch, where server 12 or the subject LPAR is not currently at its maximum memory allocation. In such a case, rules engine 50 will determine if there is unused memory within server 12 to allocate/enable to server 12 or the subject LPAR (decision 221). If not, rules engine 50 proceeds to steps 222 and 224, as described above. If so, rules engine 50 determines if server 12 is currently running resource allocation/de allocation program 87 (decision 230). if so, rules engine 50 will determine if computer 14 can contact the program 87 directly, without going through the management console 62 (decision 231). If so, rules engine 50 will generate a message for server 12 to allocate the additional memory to server 12 or the subject LPAR (step 233). Refer again to decision 231, yes branch, where the management console 62 is the required interface to program 87. In such a case, rules engine 50 generates a request to management console 62 to allocate additional memory to server 12 or the subject LPAR (step 234). In response, management console 62 authenticates the requester, and then forwards the request to server 12 for handling by programs 84 and 87.

Refer again to decision 230, no branch, where there is no resource allocation/de allocation program 87 in server 12. In such a case, rules engine 50 generates a message for a pager or e-mail, or to the SOAP interface to alert a systems administrator or other application to alleviate the memory overload condition (step 232). Also, the rules engine 50 can generate a message for the remote computer center 63 to alleviate the memory overload condition (step 240).

FIGS. 4(A-E) illustrate in detail steps taken by the rules engine 50 to adjust storage allocation to server 12 or an LPAR within server 12. As explained above, the parsing program 42 supplies the resource utilization data to rules engine 50. The storage utilization data indicates an amount of free/available storage or storage utilization at the current sample time. If the amount of storage utilization is less than a predetermined percentage of capacity or there is more than a predetermined amount of storage currently available (decision 400, yes branch), then this is considered normal, i.e. there is no current shortage of storage. (The predetermined threshold for percentage utilization and availability depends in part on the storage requirements of the applications currently being executed. By way of example, a ten percent availability of storage may be considered sufficient for normal operation for some applications.) In this case, no action is taken to change the storage allocation or storage policy rules (step 404). In one embodiment of the present invention, there is the capability to change storage allocation for server 12 or at least for a subject LPAR. In another embodiment of the present invention, there is no capability to change storage allocation for server 12 or the subject LPAR; however, there is capability to change the "storage policy". As explained above, the "storage policy" affects which files are backed up to storage and for how long, and how many copies are made. Thus, a change in storage policy affects the amount of utilization of the storage.

Refer again to decision 400, no branch where the amount of storage utilization during the current sampling is more than the predetermined percentage or the amount of free storage during the current sampling is less than predetermined threshold. In such a case, rules engine 50 determines if the storage at issue is local to server 12 (decision 410). Rules engine 50 makes this determination based on a storage identity parameter that accompanied the storage utilization data supplied from server 12. If the storage at issue is local to server 12 (decision 410, yes branch), then rules engine 50 determines from the database 113 if additional local storage (ex. DASD) is available (decision 414). If so, then rules engine 50 generates a storage allocation request and addresses it to server 12 (step 420). In one embodiment of the present invention, program 73 formats the storage allocation request into an XML or SSH command, with the various parameters necessary for program 84 in server 12 to generate a command script (similar in form to the command script for the processor or memory allocation) for operating program 84 (step 420). Program 87 receives the request and assigns an additional physical volume of storage to a volume group currently assigned to server 12 or the subject LPAR (which is short of storage) (step 422).

By way of example, an SSH request from computer 14 to server 12 in step 420 to allocate additional storage could be as follows (where server 12 is an IBM pSeries server):

"ssh root@hostname chdev-L hdisk1-a pv=yes"

which means to connect to server 12 or the subject LPAR (as "host name") with "root" authority in encrypted "ssh" manner, and pass the command "change device" (i.e. "chdev") hard disk#1 attribute ("a") such that physical device ("pv") equals yes. In other words, an unused hard disk #1 is now a physical volume. Other executable code could then extend an existing volume group by the addition of this new physical volume:

"ssh root@hostname extendvg (name of existing volume group to be extended) Lhdisk1"

Alternately, the command script or executable code will create a new volume group with the Lhdisk 1 as the storage within this new volume group:

"mkvg data1vg Lhdisk1"

where "mkvg" means to "make a volume group" called "data 1vb" from physical volume "Lhdisk1"

The command script generated by program 84 can also request program 87 to set attributes of the physical volume to tune performance (step 426). For example, a change physical volume" ("chpv") command can be used to set attributes in an IBM pSeries server such as creating partitions in the volume and limiting what data can be stored in the different partitions. The command script for a pSeries server can also request program 87 to set "vary on" for the volume group to "varyon vg vgname" to make the storage volume available to the server 12 or subject LPAR (step 428). The command script for a pSeries server also requests program 87 to create a logical volume from the logical group created in step 422 or extends a logical volume to include a new volume group created in step 422 (step 430). The command script for a pSeries server also requests program 87 to make a file system on the volume to name the file system and define meta data and layout of the data within the new logical volume or extension of the extended logical volume (step 432). The command script for a pSeries server also requests program 87 to mount the file system to notify the operating system of the name and access method for the new file system (step 434). As noted above, the present invention is applicable to a wide variety of types of servers; the foregoing code for an IBM pSeries server is just one example. By way of example, steps 422-436 can be performed by script program 84.

Refer again to decision 414, no branch, where the storage at issue is local, but there is none available to add to server 12 or the subject LPAR. In such a case, the rules engine 50 notifies the remote computer center 63 and the SOAP interface of the storage constraint and lack of availability of additional storage at server 12 (steps 416 and 418).

Refer again to decision 410, no branch, where the storage at issue is not local to server 12. In such a case, the rules engine 50 determines from the database 113 whether the remote storage is SAN/iSCSI, NAS/NFS, Virtualized Storage Network or other remote storage architecture (decisions 460, 470, 480 and 490). "SAN/iSCSI" means that the remote storage is coupled via a storage area network and is accessible using a SCSI message format encapsulated in IP (Internet Protocol). "SCSI" is an industry standard. The encapsulation of the SCSI message in IP allows the SCSI commands to be communicated over the Internet. "NAS/NFS" means that the storage is coupled via network attached storage and is accessible through a network file system ("NFS") protocol defined in Request for Comments (RFC) 1094. "NFS" is an industry standard. Virtualized Storage Network (such as an IBM Storage Tank storage) is a specialized implementation of a SAN file system in combination with the IBM SAN Volume Controller which uses NFS version 4 and includes storage policies to indicate the timing and commitment of the backups, how many backup copies to make, and the expiration time for different types of data.

Figure 4A:
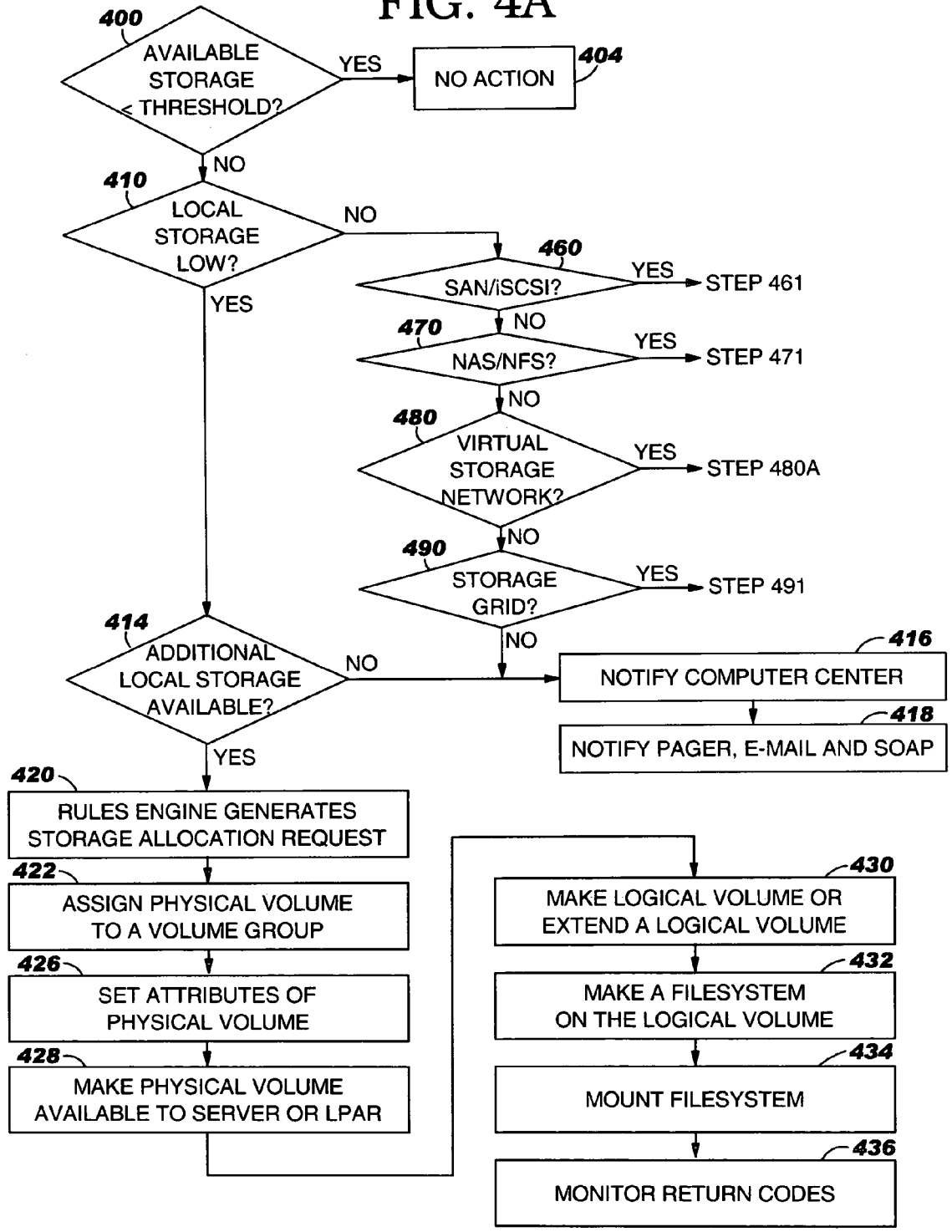
FIGS. 4(A-E) form a flow chart illustrating steps performed by the rules engine within the management computer of FIG. 1 to dynamically manage storage allocation to the managed server.
Figure 4B:
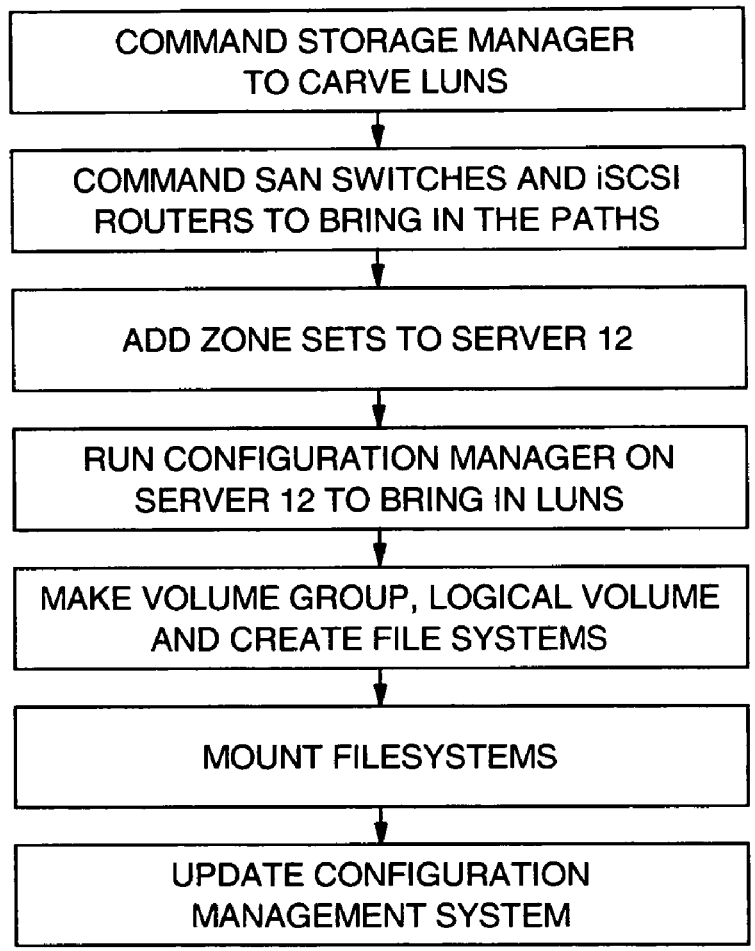

In the case of the storage being SAN/iSCSI (decision 460, yes branch), rules engine 50 generates a storage allocation request and forwards it to program 73. Program 73 generates a corresponding XML message or initiates an SSH session with a corresponding command. Program 84 receives the XML message or SSH command, and in response generates a command script to reconfigure the remote storage device into logical storage units, identify a path between the remote storage device and server 12 or the subject LPAR, and notify server 12 or the subject LPAR how to communicate with the remote storage device/logical storage unit allocated to server 12 or the subject LPAR. When the server is a pSeries server and the remote storage device is an IBM Shark storage device, the command script can do the following as illustrated in FIG. 4(B). A command is passed to the remote storage device command line interface to carve the remote storage device into logical unit numbers (step 461). Then, a command is passed to SAN switches and iSCSI routers located between the remote storage device and server 12 to "bring in the paths" i.e. allow multiple parallel pathing (through a crossbar switch or the like) between the remote storage device and the server 12 (step 462). Then, a configuration file is created and sent to a specified configuration file directory within server 12 to inform server 12 of the new zone sets and logical storage units and how to communicate to them (step 463). The "zone sets" specify the multiple paths to various storage devices via various storage adapters in server 12. Then, a command is passed to the operating system within server 12 to run a configuration manager to create a device name for each of the new logical storage units (step 464). (In AIX these are /dev/hdisk## or /dev/vpath##s.) These are the names subsequently used by the server 12 to access the newly allocated storage units. Then, a command is passed to the operating system within server 12 to make a new volume group, new logical volume and a corresponding file system for the newly allocated logical storage units (step 465). Then, a command is passed to the operating system within server 12 to mount the file system (step 466). Then, commands are passed to the database 113 to indicate the additional allocation of this storage to server 12 or the subject LPAR (step 467).

Figure 4C:
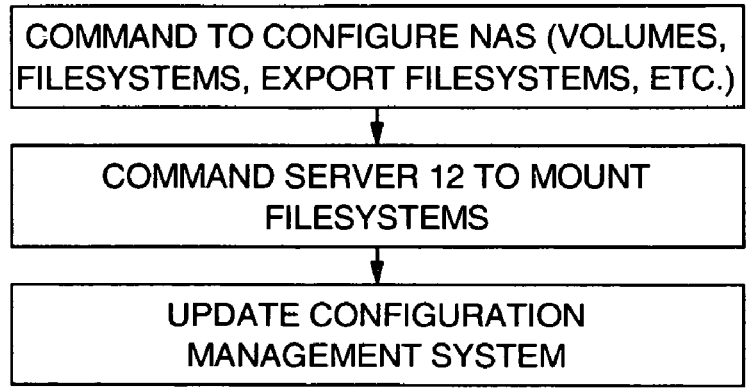

In the case of the storage being NAS/NFS (decision 470, yes branch), rules engine 50 generates a storage allocation request and forwards it to program 73. Program 73 generates a corresponding XML message or initiates an SSH session with a corresponding command. Program 84 receives the XML message or SSH command, and in response generates a command script to carve out a new logical volume group with volumes from the physical storage available on the NAS, create a directory entry and file system for the new logical volume, identify that server 12 or the subject LPAR has authority to access this new logical volume group and provide the IP address of the new logical volume to server 12 or the subject LPAR. When the server is a pSeries server, the command script or executable code can do the following as illustrated in FIG. 4(C). Commands are passed to the NAS server (which manages the NAS storage devices) to configure volumes and respective file systems, and export the file systems, i.e. make it available for attachment by server 12 or a subject LPAR (step 471). Then, commands are passed to the operating system within server 12 to mount the file system just configured (step 472). Server 12 mounts the file system by recording the IP address and mount point name of the newly allocated storage. Then, commands are passed to the database 113 to indicate the additional allocation of this storage to server 12 or the subject LPAR (step 473). Thereafter, server 12 or the subject LPAR can access the newly allocated NAS storage by sending the access request to the IP address of the newly allocated NAS storage. The NAS server will grant access to server 12 or the subject LPAR based on the identity of server 12 or the subject LPAR.

Figure 4D:
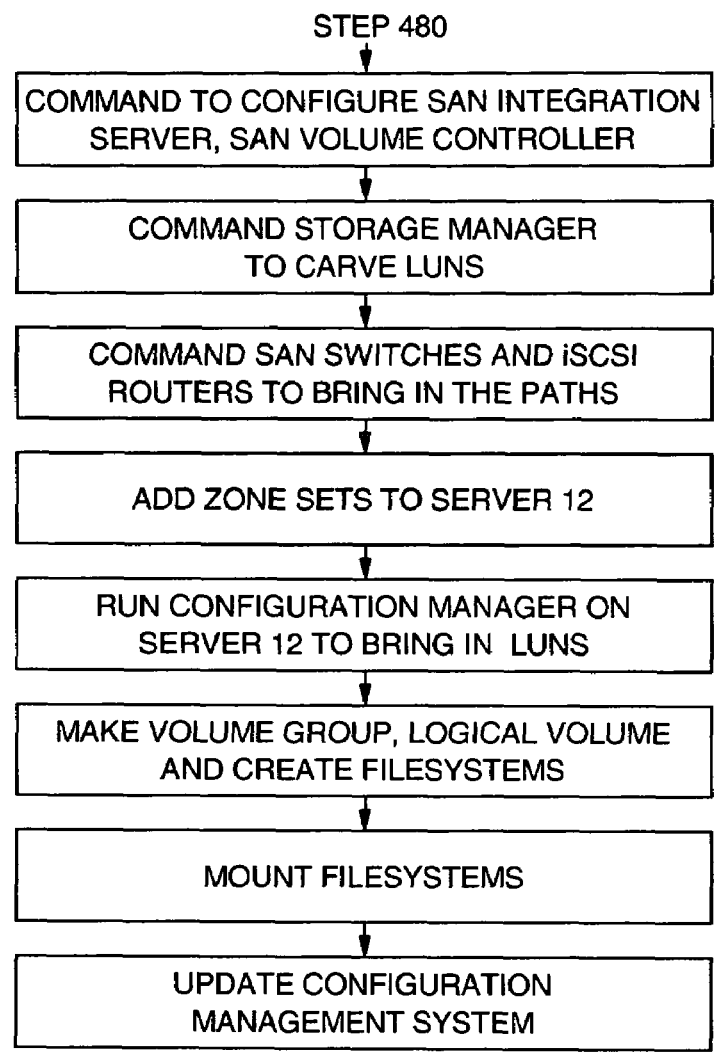
Figure 4E:
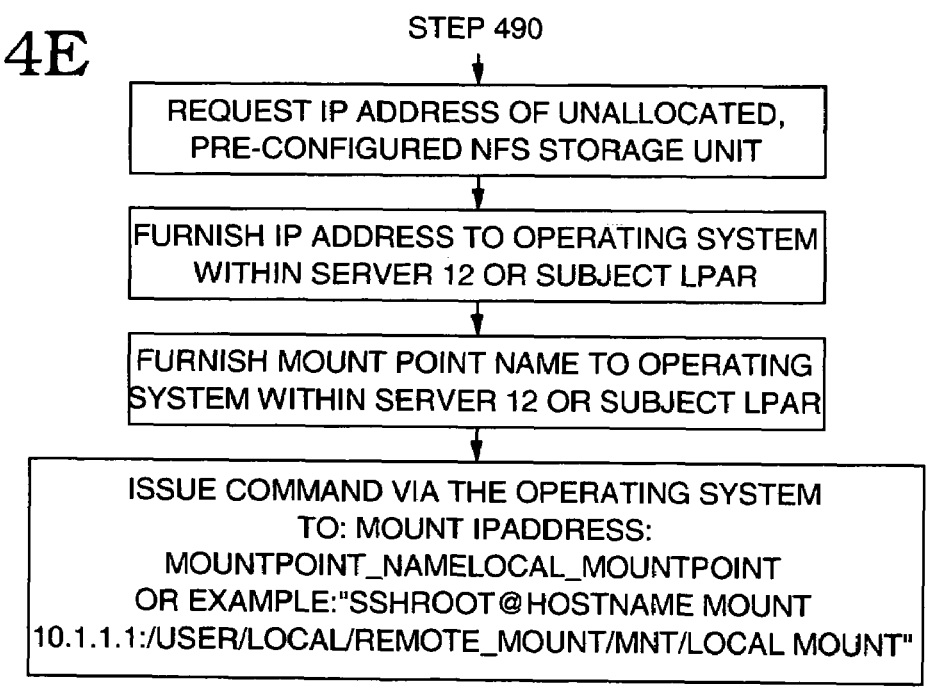

In the case of the storage being a Virtualized Storage Network (decision 480, yes branch), the process for allocating new storage to server 12 or the subject LPAR is the same as for the SAN/iSCSI, except for the addition of a preliminary step 489, as illustrated in FIG. 4(D). In step 489, commands are passed to the SAN integration server and SAN volume controller to establish the storage polices as noted above. Steps 481-487 are similar to respective steps 471-477 described above.

Consider next the case of the remote storage being a type other than SAN/iSCSI, NAS/NFS or Virtual Storage Network, such as a Storage Grid defined by a Open Grid Services Architecture (www.globus.org) document (decision 490, yes branch). In the Open Grid Services Architecture, storage is pre-configured as NFS version 4 storage units, awaiting allocation. In such a case, rules engine 50 generates a storage allocation request and forwards it to program 73. Program 73 generates a corresponding XML message or initiates an SSH session with a corresponding command. Program 84 receives the XML message or SSH command, and in response requests from the rules engine the IP address of an unallocated, pre-configured NFS storage unit (step 491). After receiving the IP address and mount point names, program 84 generates a command script to furnish the IP address of the pre-configured NFS storage units to the operating system within server 12 or the subject LPAR (step 492). For example, if an NFS Server with address 10.1.1.1 had a file system (/test1) and /etc/export configured for access from a server, a command script could mount the file system for use: ssh username@hostname mount 10.1.1.1:/test1/u/test1. Then, commands are passed to the database 113 to indicate the additional allocation of this storage to server 12 or the subject LPAR.

Figure 5:
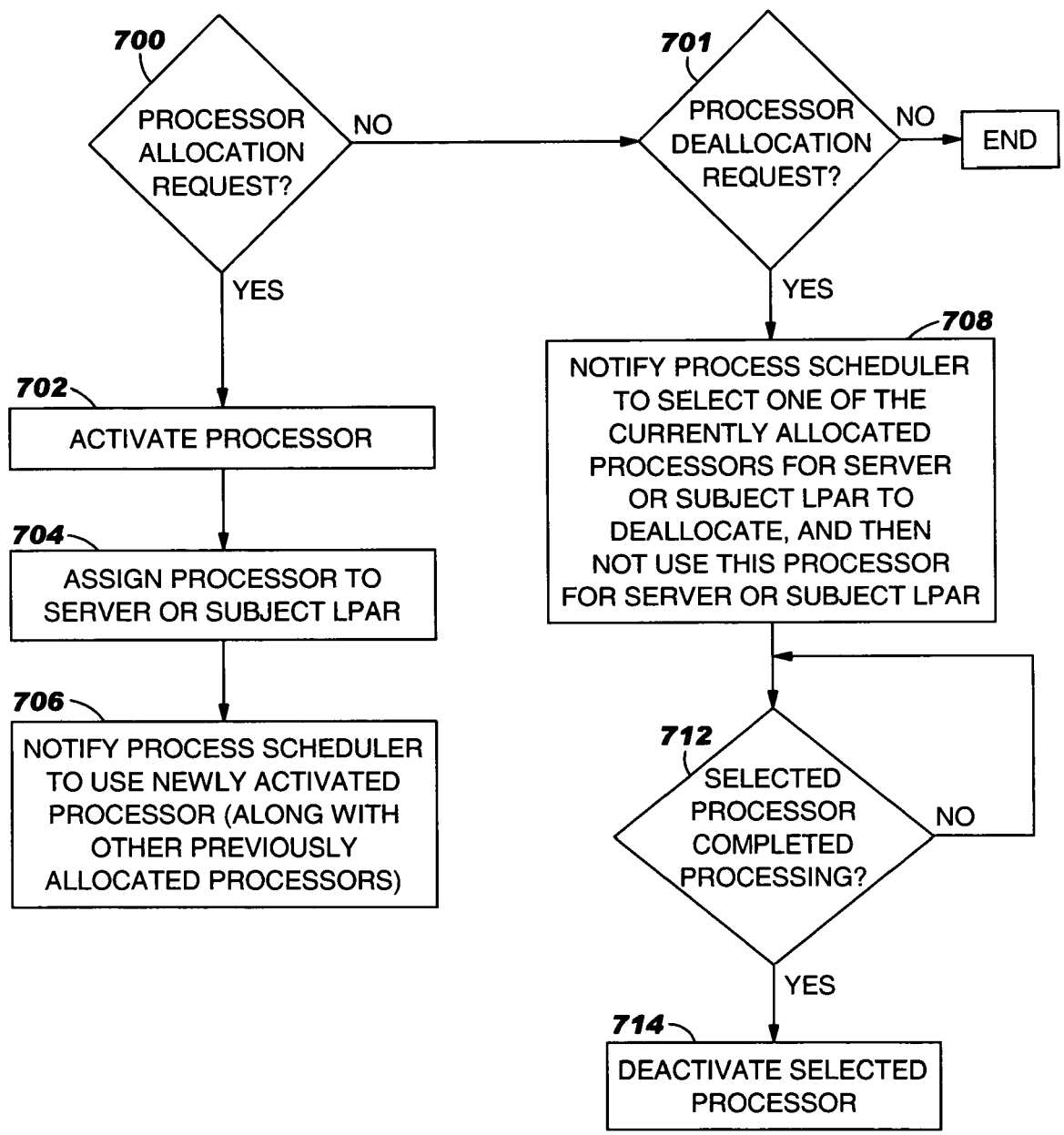
FIG. 5 illustrates the steps of a resource allocation/de allocation program to automatically adjust processor allocation for the managed server of FIG. 1 in response to a command script generated by a resource allocation/de allocation control program of the managed server.

FIG. 5 illustrates in detail the function of resource allocation/de allocation program 87 to automatically adjust the processor allocation for server 12 in response to a command script generated by program 84. In the case of a processor allocation (decision 700, yes branch), the resource allocation/de allocation program 87 activates/enables a processor (step 702). Program 87 activates the processor by requesting the operating system in server 12 to assign an additional, unused processor to server 12 or the subject LPAR (step 704). After assigning the additional processor, the operating system in server 12 schedules program tasks/program execution of server 12 to the preexisting active processors and the additional processor to balance their respective work loads. Alternately in step 704, program 87 can request that a resource allocation program such as IBM Capacity Upgrade On Demand (CUOD) program allocate the additional processor to server 12 or the subject LPAR. In such a case, the IBM CUOD makes the foregoing request to the operating system to assign an additional processor to server 12 or the subject LPAR. After either embodiment of step 704, program 87 notifies a process scheduler (within operating system 18) for the server 12 or subject LPAR that the newly activated processor is available to execute processes for the server 12 or subject LPAR (step 706). In the case of a processor de allocation (decision 700, no branch and decision 701, yes branch), program 87 selects one of the processors currently allocated to server 12 or the subject LPAR for de allocation and notifies the process scheduler for the server 12 or the subject LPAR not to execute any more processes for the server 12 or the subject LPAR on the selected processor (step 708). After all the processes currently executing on the unassigned processor complete their processing (decision 712, yes branch), then program 87 deactivates the unassigned processor (step 714).

Figure 6:
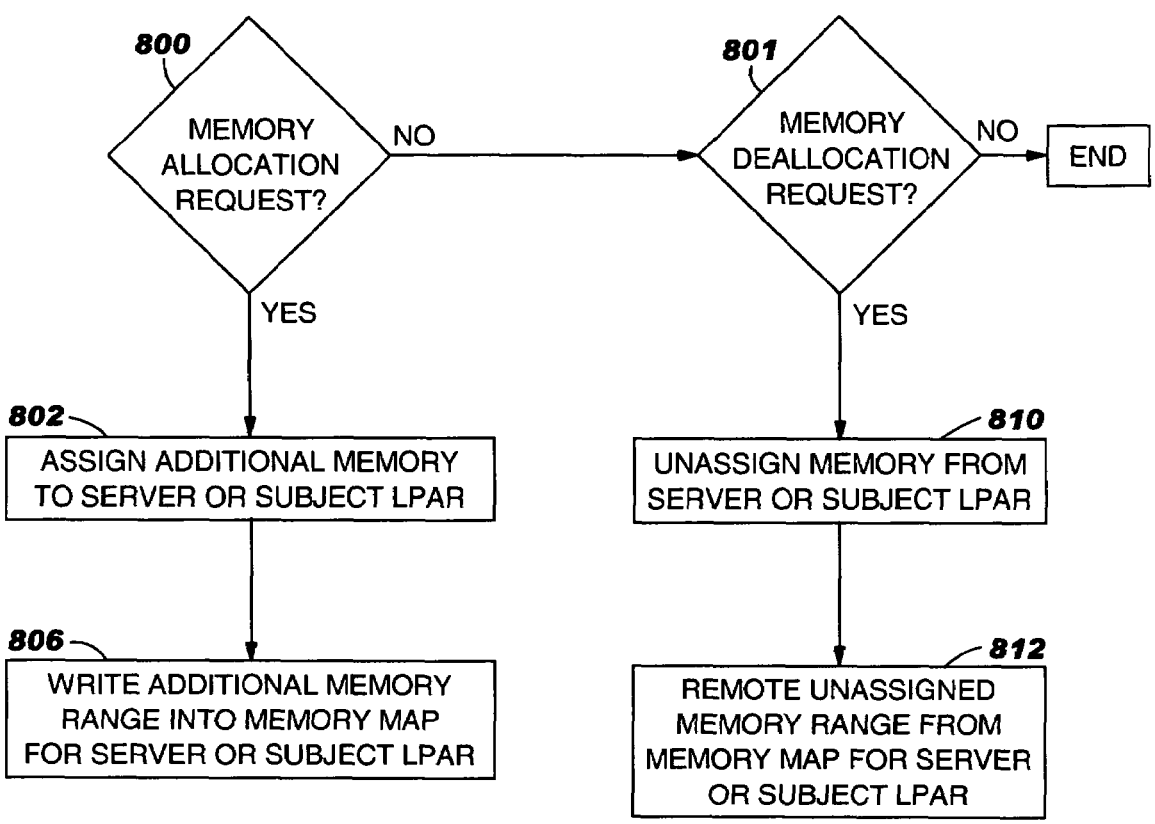
FIG. 6 illustrates the steps of the resource allocation/de allocation program to automatically adjust memory allocation for the managed server of FIG. 1 in response to a command script generated by the resource allocation/de allocation control program of the managed server.

FIG. 6 illustrates in detail the function of resource allocation/de allocation program 87 to automatically adjust the memory allocation for server 12 in response to the command script generated by program 84. In the case of a memory allocation request (decision 800, yes branch), the resource allocation/de allocation program 87 assigns additional, spare memory (i.e. memory that is not currently in use or assigned to a program or LPAR within server 12) to server 12 or the subject LPAR (step 802). The resource allocation/de allocation program 87 notifies the memory manager of the allocation of the additional memory, and the memory manager uses the additional memory when needed. Then, program 87 writes the addresses of the newly allocated memory into a memory map used by operating system 18 (step 806). A logical memory manager within operating system 18 for the server 12 or subject LPAR uses the memory map to identify memory available to the server 12 or subject LPAR, so that when the additional addresses are added to the memory map for server 12 or the subject LPAR, then additional memory is available to the server 12 or subject LPAR. Conversely, in the case of a request to de allocate memory currently allocated to server 12 or the subject LPAR (decision 800, no branch and decision 801, yes branch), program 87 unassigns from server 12 or the subject LPAR some of the memory that is currently assigned to server 12 or the subject LPAR and is empty (step 810). Then, program 87 removes the addresses of the de allocated/unassigned memory from the memory map (step 812). Because the logical memory manager will no longer access this memory for server 12 or the subject LPAR, this memory has been effectively de allocated.

Based on the foregoing, a system, method and program for automatically adjusting allocation of computer resources have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A computer system for automatically adjusting allocation of a plurality of real processors, physically resident within a server, to a logical partition ("LPAR") of the server, the computer system comprising:

a CPU, a computer readable memory and a computer readable storage media;

first program instructions, responsive to utilization of the real processor(s) of the plurality which are currently allocated to the LPAR being above a predetermined upper threshold, to automatically change a boot configuration file of the server to increase a number of the real processors, physically resident within the server, allocated to the LPAR effective upon a next boot-up of the server, such that a number of real processors, physically resident within the server, allocated to the LPAR will be greater after the next boot-up of the server than prior to the next boot-up of the server during a current operation of the server;

second program instructions, responsive to utilization of the real processor(s) of the plurality which are currently allocated to the LPAR being below a predetermined lower threshold, to automatically change a boot configuration file of the server to decrease a number of the real processors, physically resident within the server, allocated to the LPAR effective upon a next boot-up of the server, such that a number of real processors, physically resident with the server, allocated to the LPAR will be lesser after the next boot-up of the server than prior to the next boot-up of the server during a current operation of the server;

third program instructions to monitor an amount of available RAM allocated to the LPAR and a rate of page swaps from the RAM, allocated to the LPAR, to a disk storage of the server; and fourth program instructions, responsive to the amount of available RAM being less than a first predetermined threshold and the rate of page swaps being greater than a second predetermined threshold, to automatically send an electronic notification to the server to increase an amount of RAM, physically resident within the server, allocated to the LPAR; and wherein the first, second, third and fourth program instructions are stored on the computer readable storage media for execution by the CPU via the computer readable memory; and the server including a second CPU, a second computer readable memory and a second computer readable storage media; and further comprising:

fifth program instructions, responsive to the electronic notification sent by the fourth program instructions to the server, to increase the amount of RAM, physically resident within the server, allocated to the LPAR; and wherein the fifth program instructions are stored on the second computer readable storage media for execution by the second CPU via the second computer readable memory.

2. A computer program product for automatically adjusting allocation of a plurality of real processors, physically resident within a server, to a logical partition ("LPAR") of the server, the computer program product comprising:

a computer readable storage media;

first program instructions, responsive to utilization of the real processor(s) of the plurality which are currently allocated to the LPAR being above a predetermined upper threshold, to automatically change a boot configuration file of the server to increase a number of the real processors, physically resident within the server, allocated to the LPAR effective upon a next boot-up of the server, such that a number of real processors, physically resident within the server, allocated to the LPAR will be greater after the next boot-up of the server than prior to the next boot-up of the server during a current operation of the server;

second program instructions, responsive to utilization of the real processor(s) of the plurality which are currently allocated to the LPAR being below a predetermined lower threshold, to automatically change a boot configuration file of the server to decrease a number of the real processors, physically resident within the server, allocated to the LPAR effective upon a next boot-up of the server, such that a number of real processors, physically resident with the server, allocated to the LPAR will be lesser after the next boot-up of the server than prior to the next boot-up of the server during a current operation of the server;

third program instructions to monitor an amount of available RAM allocated to the LPAR and a rate of page swaps from the RAM, allocated to the LPAR, to a disk storage of the server;

fourth program instructions, responsive to the amount of available RAM being less than a first predetermined threshold and the rate of page swaps being greater than a second predetermined threshold, to automatically send an electronic notification to the server to increase an amount of RAM, physically resident within the server, allocated to the LPAR; and fifth program instructions, responsive to the electronic notification sent by the fourth program instructions to the server, to increase the amount of RAM, physically resident within the server, allocated to the LPAR; and wherein the first, second, third, fourth and fifth program instructions are stored on the computer readable storage media.

* * * * *